(12) United States Patent  (10) Patent No.: US 7,806,646 B2
Riordan et al.  (45) Date of Patent: *Oct. 5, 2010

(54) DELIVERY RACK SYSTEM FOR STOCKING PRODUCTION LINES

(75) Inventors: Anthony Riordan, Braintree (GB); Robert Liggins, Writtle (GB); Cliff Graham, Horndon on the Hill (GB); Michael Colberg, Achim (DE)

(73) Assignee: Ford Motor Company, Dearborn, MI (US)

( * ) Notice: Subject to any disclaimer, the term of this patent is extended or adjusted under 35 U.S.C. 154(b) by 283 days.

This patent is subject to a terminal disclaimer.

(21) Appl. No.: 10/905,559

(22) Filed: Jan. 11, 2005

(65) Prior Publication Data

US 2005/0084365 A1  Apr. 21, 2005

Related U.S. Application Data

(63) Continuation-in-part of application No. 10/065,224, filed on Sep. 26, 2002, now Pat. No. 6,866,463.

(60) Provisional application No. 60/333,956, filed on Nov. 28, 2001.

(51) Int. Cl.
*B60P 1/64* (2006.01)

(52) U.S. Cl. .................. 414/498; 414/331.01; 414/341; 414/389; 414/459; 414/529; 414/536; 180/14.1; 280/79.3; 280/408; 410/80

(58) Field of Classification Search .............. 414/498, 414/459, 389, 341, 529, 536, 679, 331.01, 414/812; 280/47.35, 33.997, 33.998, 33.995, 280/33.991, 79.11, 79.2, 79.3, 408; 224/279, 224/27.9; 180/14.1; 296/35.3; 211/85.8; 108/14.1, 51.11; 410/7, 51, 66, 69, 77, 80

See application file for complete search history.

(56) References Cited

U.S. PATENT DOCUMENTS

| 2,650,731 | A | | 9/1953 | Adler |
| 3,077,247 | A | * | 2/1963 | West et. al. ................. 188/111 |
| 3,305,117 | A | * | 2/1967 | Ford ........................... 414/498 |
| 3,698,735 | A | * | 10/1972 | Bloomfield et al. ...... 280/47.35 |
| 3,740,066 | A | | 6/1973 | Gieringer et al. |
| 3,752,345 | A | * | 8/1973 | Molis ......................... 414/498 |
| 3,908,831 | A | * | 9/1975 | Brendgord ............... 211/88.01 |
| 4,127,202 | A | | 11/1978 | Jennings et al. |
| 4,155,471 | A | | 5/1979 | Yancy |
| 4,511,171 | A | * | 4/1985 | Petersen ................... 296/65.01 |
| 4,515,518 | A | * | 5/1985 | Gilbert et al. ............... 414/459 |
| 4,687,215 | A | | 8/1987 | Brendgord et al. |

(Continued)

FOREIGN PATENT DOCUMENTS

FR  2 631 948  5/1988

(Continued)

*Primary Examiner*—Michael S Lowe
(74) *Attorney, Agent, or Firm*—Raymod L. Coppiellie; Brooks Kushman P.C.

(57) ABSTRACT

A delivery rack system for transporting a dolly. The delivery rack system includes a frame disposed on a plurality of wheels. The frame includes a side rail and first and second transverse rails disposed proximate the side rail. The side rail, the first transverse rail, and second transverse rail cooperate to define a compartment adapted to receive the dolly.

18 Claims, 5 Drawing Sheets

U.S. PATENT DOCUMENTS

| | | |
|---|---|---|
| 5,072,960 A | 12/1991 | Sperko |
| 5,224,812 A * | 7/1993 | Oslin et al. .................. 414/401 |
| 5,320,475 A | 6/1994 | Pinder |
| 5,445,396 A | 8/1995 | Sebor |
| 5,906,384 A | 5/1999 | Nelson |
| 6,098,761 A | 8/2000 | Kooima et al. |
| 6,257,152 B1 | 7/2001 | Liu |
| D448,135 S * | 9/2001 | Petro ........................... D34/21 |
| 6,607,199 B2 | 8/2003 | Gruber |

FOREIGN PATENT DOCUMENTS

| | | |
|---|---|---|
| FR | 2631948 A1 * | 12/1989 |
| FR | 2 773 545 | 1/1998 |

* cited by examiner

DELIVERY RACK SYSTEM FOR STOCKING PRODUCTION LINES

CROSS-REFERENCE TO RELATED APPLICATIONS

This application is a continuation-in-part of U.S. application Ser. No. 10/065,224 filed Sep. 26, 2002, now U.S. Pat. No. 6,866,463 which in turn claims the benefit of U.S. provisional application Ser. No. 60/333,956, filed Nov. 28, 2001.

BACKGROUND OF THE INVENTION

1. Field of the Invention

This invention relates to production line stocking equipment.

2. Background Art

Production lines, such as automotive assembly lines, may be serviced by material handling trucks, or tow motor trucks, that deliver component parts to production stations. In many instances, a tow motor truck is used to deliver several bins or racks to an unloading area near a production line. A lift truck, or hi-low, picks up the bins or racks from the unloading area and delivers them one at a time to one or more production stations.

Bins or racks of parts may be transported in a train configuration to improve efficiency. For example, an operator may drive the tow motor truck having a train of bins or racks to a first location and disengage a trailer hook of the last rack from the hook receptacle.

Planning is required to place bins and racks in the proper order in a train. Changes in the delivery route can disrupt even the most carefully planned drop off sequence. If, for instance, the first section of a train needs to be delivered before the other sections of the train, effort is wasted decoupling the first section and moving and reconnecting the remaining heavy part-laden train sections to the tow motor truck.

Before applicants' invention, there was a need for a simplified system for stocking production lines that provides flexibility as to the order in which parts are supplied. In addition, there was a need for a lightweight part container or dolly that could be moved by workers without requiring a lift truck. In addition, there was a need for a lightweight part container or dolly that did not have hooks and hook receptacles to reduce congestion at production line workstations. Problems associated with the prior art as noted above and other problems are addressed by applicants' invention as summarized below.

SUMMARY OF THE INVENTION

According to one aspect of the present invention, a delivery rack system for transporting a dolly is provided. The delivery rack system includes a frame, first and second sets of rollers, and a plurality of wheels. The frame includes a side rail and first and second transverse rails. The side rail is offset from a center axis. The first and second transverse rails are disposed proximate the side rail and spaced apart from each other. The first and second sets of rollers are disposed on the first and second transverse rails, respectively. The side rail, first transverse rail, and second transverse rail cooperate to define a compartment adapted to receive the dolly. The rollers engage the dolly when the dolly is inserted into the compartment. As such, the present invention simplifies the organization and transportation of dollies and parts without having to carefully organize a sequence of delivery racks.

The delivery rack system may include first and second upright rails disposed proximate the first and second transverse rails. A top rail may extend between the first and second upright rails.

The delivery rack system may include a support rail having a first end and a second end. The first end may be disposed proximate the side rail or the first transverse rail and the second end may be disposed proximate the top rail or the first upright rail.

The delivery rack system may include a hook and a hook receptacle. The hook and hook receptacle may be disposed outside the compartment along the center axis and proximate opposite ends of the frame.

A locking mechanism may be provided to engage the dolly when the dolly is disposed in the compartment. The locking mechanism may include a pivoting lever adapted to pivot between a locked position and an open position.

According to another aspect of the present invention, a delivery rack system for transporting a dolly in a manufacturing operation is provided. The delivery rack system includes a frame, a plurality of wheels that support the frame, and a plurality of rollers that facilitate positioning of the dolly. The frame includes a base, first, second, and third upright rails, a top rail, and at least one support rail. The base includes a side rail and first, second, and third transverse rails. The side rail defines a first side of the frame. The first, second, and third transverse rails are spaced apart from each other and disposed proximate the side rail. The first, second, and third upright rails are disposed proximate the first, second, and third transverse rails and at least partially define a second side of the frame. The top rail is disposed proximate the first, second, and third upright rails. The support rail is disposed proximate the base at a first end and disposed proximate the top rail at a second end. The side rail and first and second transverse rails cooperate to at least partially define a first compartment. The side rail and second and third transverse rails cooperate to at least partially define a second compartment. The first and second compartments are each adapted to receive the dolly.

First, second, and third support rails may extend between the side rail and the top rail. The first support rail may be disposed adjacent to the first compartment. The second support rail may be disposed between the first and second compartments. The third rail may be disposed adjacent to the second compartment.

The second support rail, the second upright rail, and second transverse rail may be disposed in a plane. The side rail and the first, second, and third transverse rails may be coplanar. The first, second and third upright rails may extend away from the wheels.

The first compartment may include a first opening defined by the first upright rail, the second upright rail, and top rail. The second compartment may include a second opening defined by the second upright rail, the third upright rail, and the top rail.

The dolly may include a set of wheels. At least one member of the set of wheels may contact a floor when the dolly is disposed in either the first compartment or the second compartment.

According to another aspect of the present invention, a delivery rack system for transporting a wheeled dolly in a manufacturing operation is provided. The delivery rack system includes a frame and a plurality of wheels. The frame includes a side rail, first, second, and third transverse rails, first, second, and third upright rails, a top rail, and first, second, and third support rails. The side rail is offset from a center axis and defines a first side of the frame. The first, second, and third transverse rails are spaced apart from each other and disposed proximate the side rail. The first, second, and third upright rails are disposed proximate the first, second and third transverse rails. The top rail is attached to the first, second, and third upright rails. The first, second, and third support rails extend between the side rail and the top rail. The side rail, first transverse rail, and second transverse rail cooperate to at least partially define a first compartment. The side rail, second transverse rail, and third transverse rail cooperate to at least partially define a second compartment. The first and second compartments are each adapted to receive a dolly.

The delivery rack system may include the first, second, third and fourth sets of rollers. The first set of rollers may be disposed on the first transverse rail and extend toward the first compartment. The second set of rollers may be disposed on the second transverse rail and extend toward the first compartment. The third set of rollers may be disposed on the second transverse rail and extend toward the second compartment. The fourth set of rollers may be disposed on the third transverse rail and extend toward the second compartment.

DETAILED DESCRIPTION OF THE PREFERRED EMBODIMENT(S)

Figure 1:
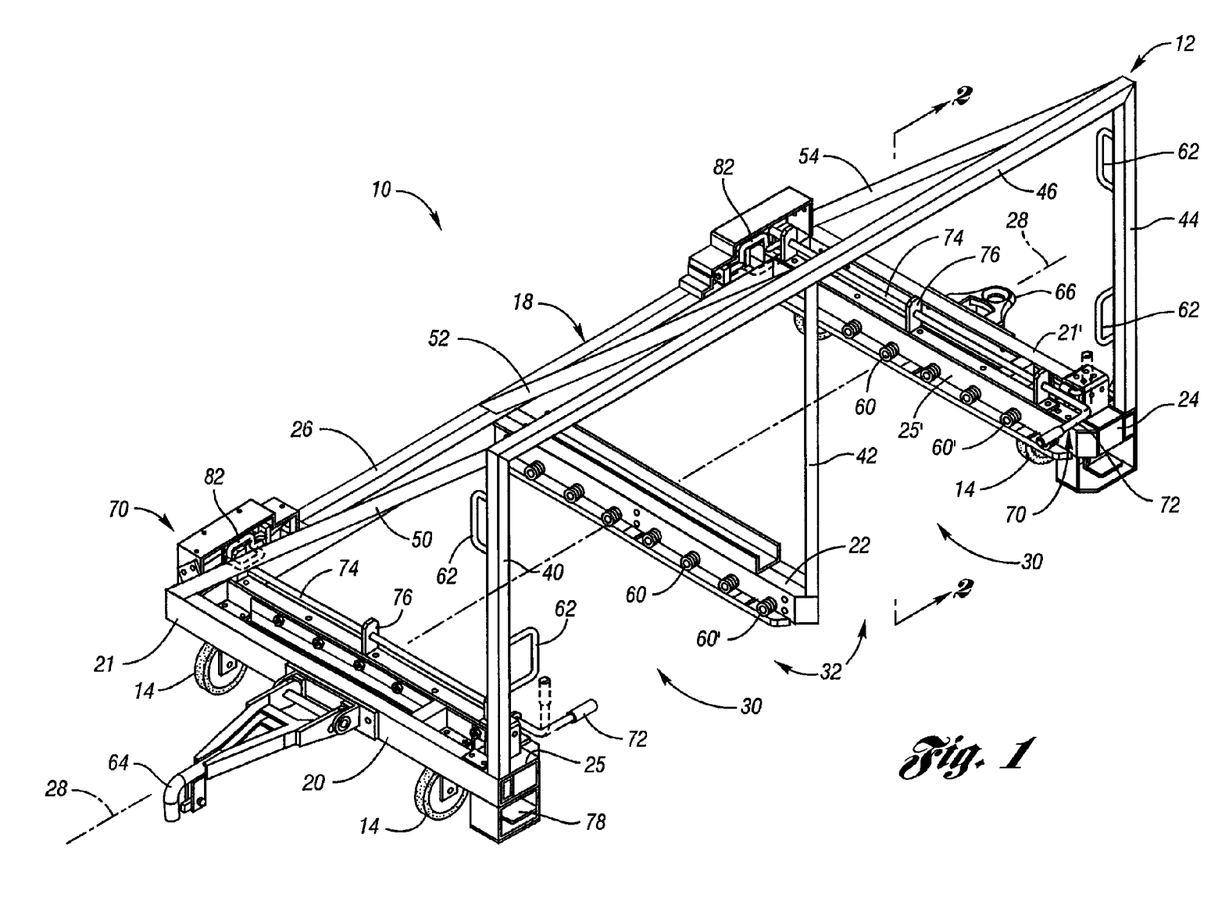
FIG. 1 is a perspective view of a delivery rack in accordance with the present invention.
Figure 2:
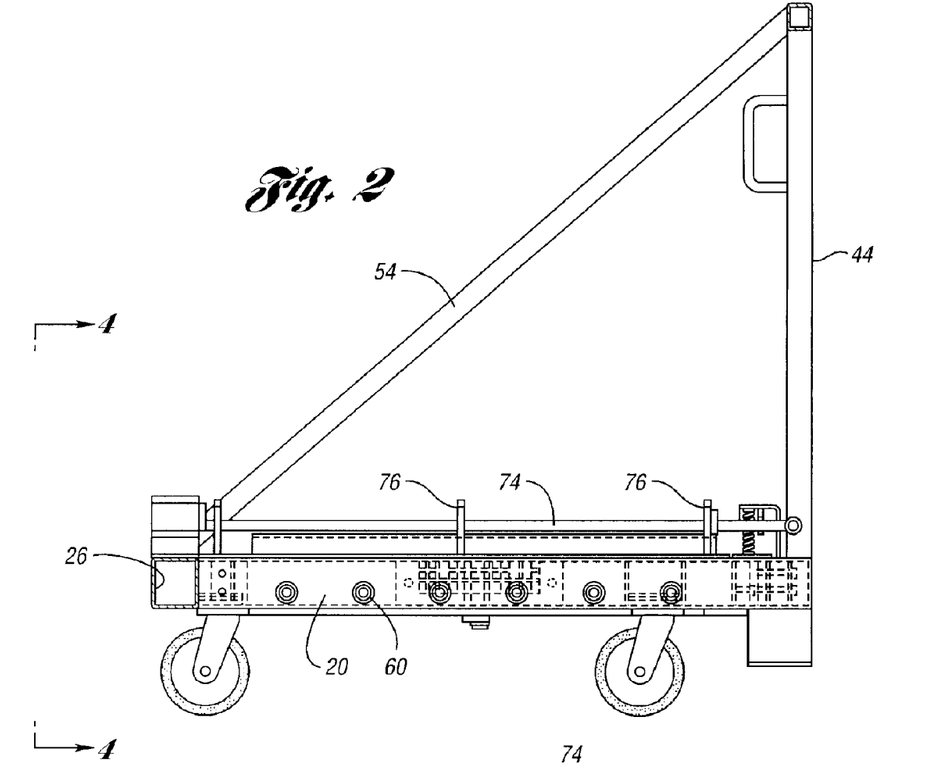
FIG. 2 is a cross-sectional view of the delivery rack along line 2-2 in FIG. 1.

Referring to FIG. 1, one embodiment of a delivery rack 10 is shown. In this embodiment, the delivery rack 10 includes a frame 12 supported on wheels 14. The wheels 14 may be configured to pivot with respect to the frame 12 to facilitate turning and positioning of the delivery rack 10.

The frame 12 may include various structural members, generically designated "rails" for convenience in reference herein. The rails may have any suitable configuration. For example, the rails may have solid or tubular structure or combinations thereof. In addition, the rails may be made of any suitable material, such as metal or a polymeric material.

The frame 12 may include one or more transverse rails that at least partially define a base 18. In the embodiment shown in FIG. 1, the base 18 has a generally E-shaped configuration and includes a first transverse rail 20, a second transverse rail 22, and a third transverse rail 24. The first and third transverse rails may include first and second beams 21, 25 and 21', 25', respectively, that may extend substantially parallel to each other and may be spaced apart from each other. The first, second, and third transverse rails 20,22,24 may be connected or attached to a fourth or side transverse rail 26 that is offset from a center longitudinal axis 28 of the delivery rack 10. The transverse rails 20,22,24,26 may have any suitable configuration. For example, the first, second, and third transverse rails 20,22,24 maybe disposed approximately perpendicular to the fourth transverse rail 26 and generally parallel to each other. In addition, the transverse rails 20,22,24,26 may be disposed in a common plane. Moreover, all or some of the transverse rails 20,22,24,26 may be integrally formed.

The frame 12 and transverse rails 20, 22, 24, 26 cooperate to at least partially define one or more compartments 30. In the embodiment shown, the frame 12 includes first and second compartments. The present invention also contemplates embodiments having a single compartment or more than two compartments.

Each compartment 30 may have an opening 32. In the embodiment shown, the compartments 30 are open near the ends of the transverse rails 20, 22, 24 disposed opposite the side rail 26. Alternatively, the base 18 may be configured such that openings of one or more compartments face in different directions. For example, the base 18 may have a serpentine or S-shaped configuration with a plurality of side transverse rails and openings that face opposite directions.

Figure 5:
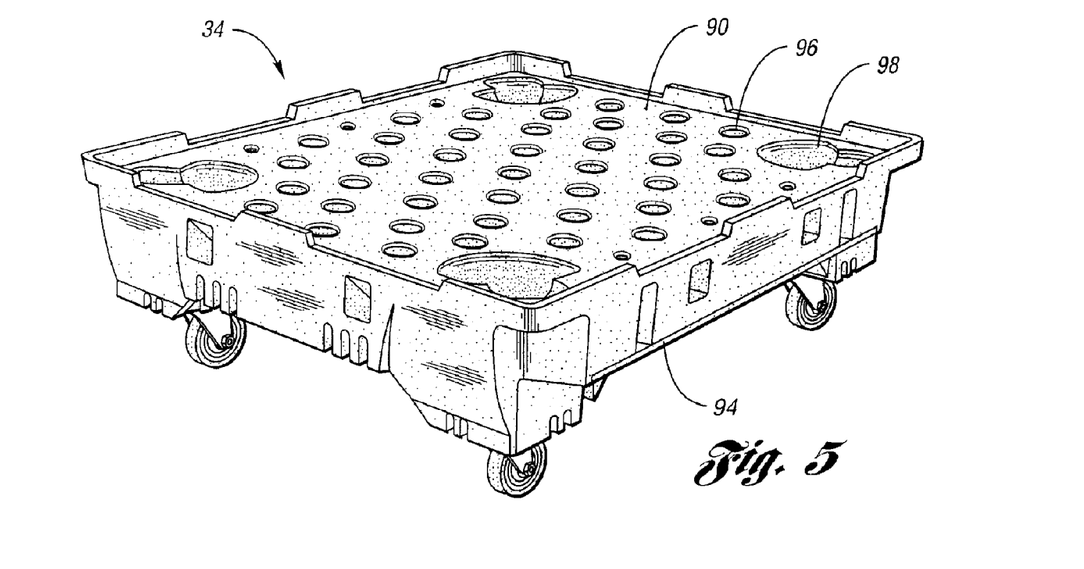
FIG. 5 is a perspective view of a dolly.
Figure 6:
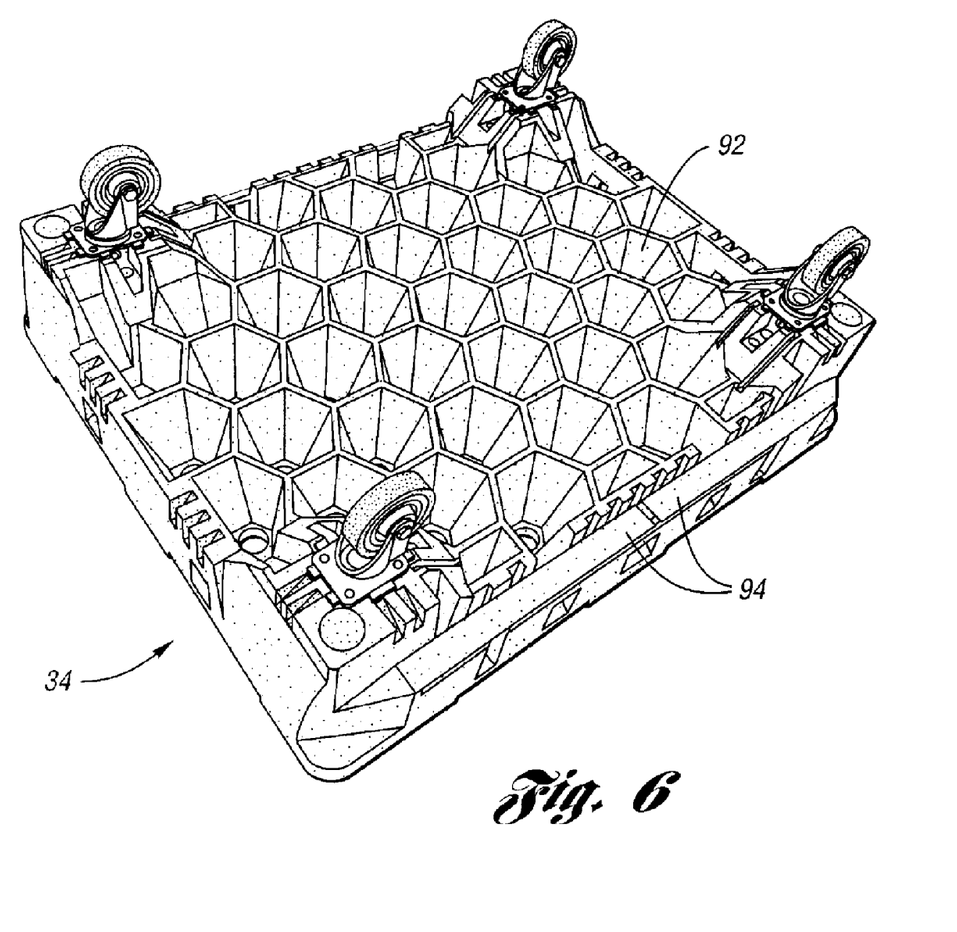
FIG. 6 is a bottom perspective view of the dolly shown in FIG. 5.

Each compartment 30 is configured to receive a material handling device, such as a dolly 34, via its respective opening 32. An exemplary dolly is shown in FIGS. 5 and 6 and described in more detail below.

The frame 12 may include one or more upright rails. In the embodiment shown, the frame 12 includes a first upright rail 40, a second upright rail 42, and a third upright rail 44. The first, second, and third upright rails 40, 42, 44 may be connected or attached to the first, second, and third transverse rails 20, 22, 24, respectively. The upright rails 40, 42, 44 may be attached to base 18 at any suitable location. In one embodiment, the first, second, and third upright rails 40, 42, 44 are attached at lower ends to the first, second, and third transverse rails 20, 22, 24, respectively, near opening 32. In addition, the first, second, and third upright rails 40, 42, 44 may extend generally perpendicular to the first, second, and third transverse rails 20, 22, 24 and may be disposed in a common plane. One or more of the upright rails 40, 42, 44 may be integrally formed with a portion of the base 18.

Optionally, a top rail 46 may be disposed proximate or attached to one or more upright rails. In the embodiment shown, the top rail 46 is disposed proximate an upper end of the first, second, and third upright rails 40, 42, 44. The top rail 46 may have any suitable configuration and may be integrally formed with one or more upright rails 40, 42, 44.

The frame 12 may also include one or more support rails. In the embodiment shown, the frame 12 includes a first support rail 50, a second support rail 52, and a third support rail 54. The first, second, and third support rails 50, 52, 54 may each be connected or attached to the base 18 at a first end and to an upright rail 40, 42, 44 and/or the top rail 46 at a second end disposed opposite the first end. The support rails 50, 52, 54 provide additional structural support and rigidity and may have any suitable configuration. In the embodiment shown in FIG. 1, each support rail 50, 52, 54 has a generally linear configuration and is disposed at an angle relative to the base 18 to form a generally triangular shape with its associated transverse and upright rails.

The frame 12 may include a plurality of rollers or guide members that facilitate positioning of the dolly 34 relative to a compartment 30. In the embodiment shown, a plurality of rollers 60 are disposed proximate the transverse rails 20, 22, 24. The rollers 60 may be spaced apart and each roller 60 may have an axis of rotation disposed generally perpendicular to its respective transverse rail and/or an associated compartment opening. Optionally, at least one roller, designated 60', may be downwardly offset relative to the other rollers 60 so that a dolly 34 may be lifted slightly as it is inserted into a compartment 30.

The frame 12 and rollers 60, 60' may be configured to allow one or more wheels of a dolly 34 to remain in contact with a floor or ground surface when the dolly 34 is disposed on a compartment 30. Alternatively, the frame 12 and rollers 60, 60' may be configured to space one or more dolly wheels apart from a floor or ground surface when the dolly 34 is disposed on a compartment 30.

Optionally, a plurality of handles 62 may be provided on the rack 10 to facilitate maneuvering of the rack 10 by hand. In the embodiment shown, handles 62 are disposed proximate the first and third upright rails 40, 44.

Figure 7:
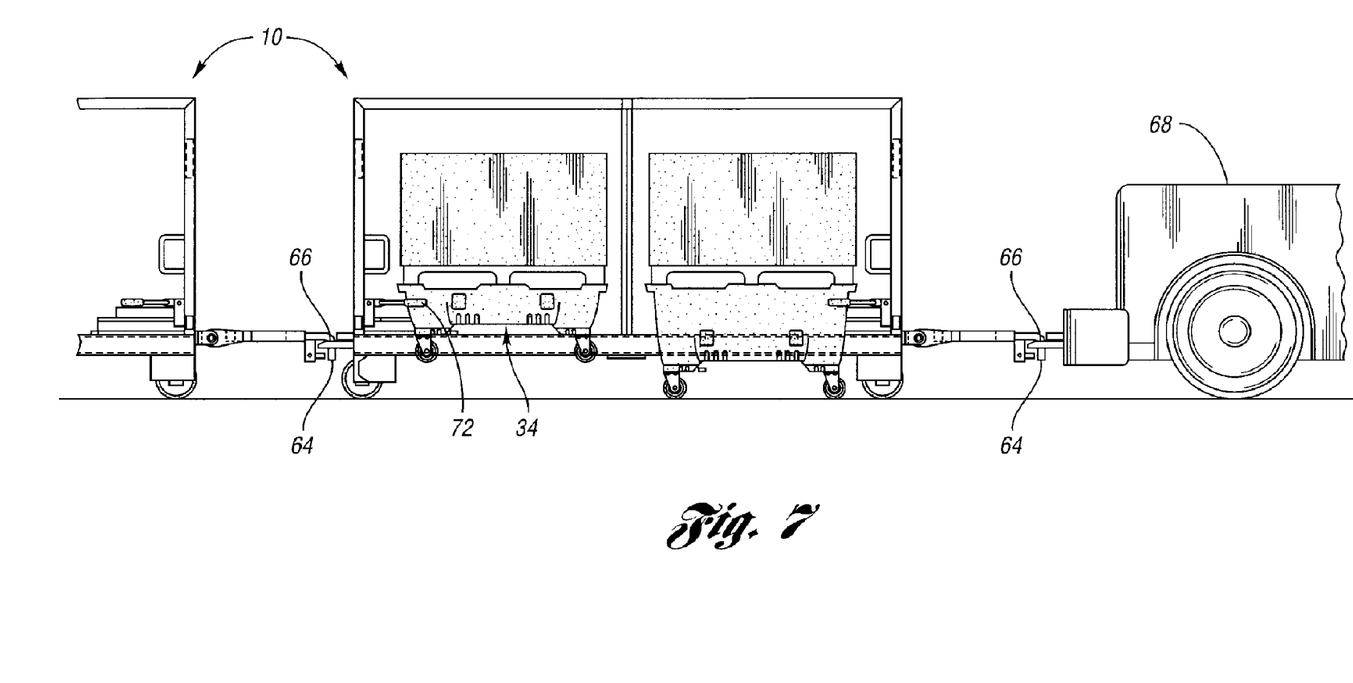
FIG. 7 is a side view of a tow motor truck and a plurality of delivery racks coupled to form a train.

The rack 10 may include a hook 64 and hook receptacle 66. The hook 64 and hook receptacle 66 may have any suitable configuration and may be disposed in any suitable location. For example, the hook 64 and/or hook receptacle may be disposed proximate the base 18. In the embodiment shown, the hook 64 is attached to the first transverse rail 20 along the center axis 28 and the hook receptacle 66 is attached to the third transverse rail 24 along the center axis 28. The hook 64 is adapted to be selectively coupled to a tow motor truck 68 or the hook receptacle 66 of another rack 10. As a result, the hook 64 and hook receptacle 66 permit arrangement of a plurality of delivery racks as a train as shown in FIG. 7.

The rack 10 may also include one or more locking elements or locking mechanisms 70 associated with each compartment 30. The locking mechanisms 70 may be disposed in any suitable location, such as proximate the base 18. The locking mechanisms 70 are adapted to engage and retain a dolly 34 within its associated compartment.

Referring to FIGS. 1-4, an exemplary embodiment of a locking mechanism 70 is shown in more detail. In this embodiment, the locking mechanism 70 includes a pivot lever 72 that is adapted to pivot between a generally vertical or open position shown in phantom in FIG. 1 and a locked position shown in solid lines in FIG. 1. A dolly 34 may be inserted into or removed from a compartment 30 when the pivot lever 72 is in the open position. Insertion or removal of a dolly 34 is inhibited when the pivot lever 72 is in the locked position.

The pivot lever 72 may be coupled to or integrally formed with an elongate bar 74. The elongate bar 74 may be moveably retained by guide blocks 76 disposed at spaced points along the base 18.

A pedal 78 for manually operating the locking mechanism 70 may be coupled to the pivot lever 72 or elongate bar 74. The pedal 78 may be disposed in any suitable location. In the embodiment shown in FIG. 1, the pedal 78 is disposed below a transverse rail. In the embodiment shown in FIG. 3, the pedal 78' is disposed above the transverse rail.

Figure 3:
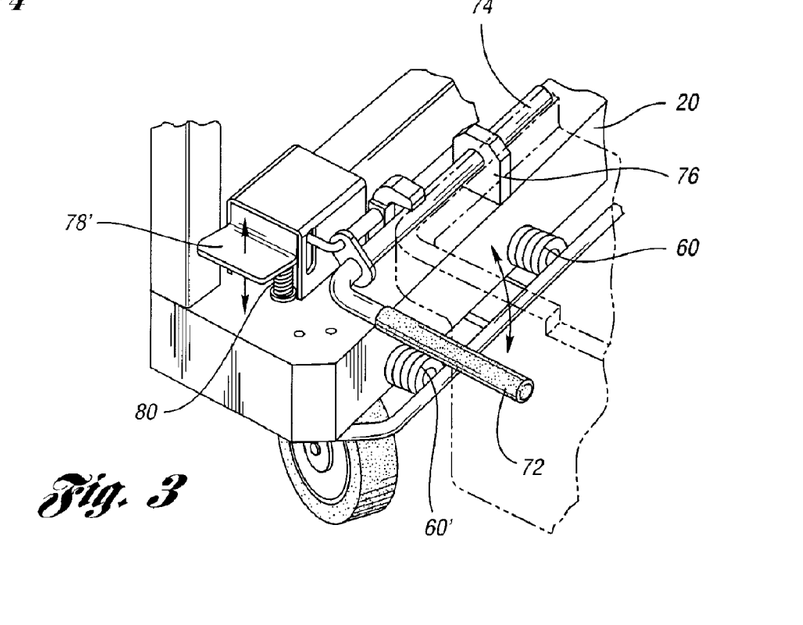
FIG. 3 is a fragmentary side perspective view of part of an exemplary locking mechanism.
Figure 4:
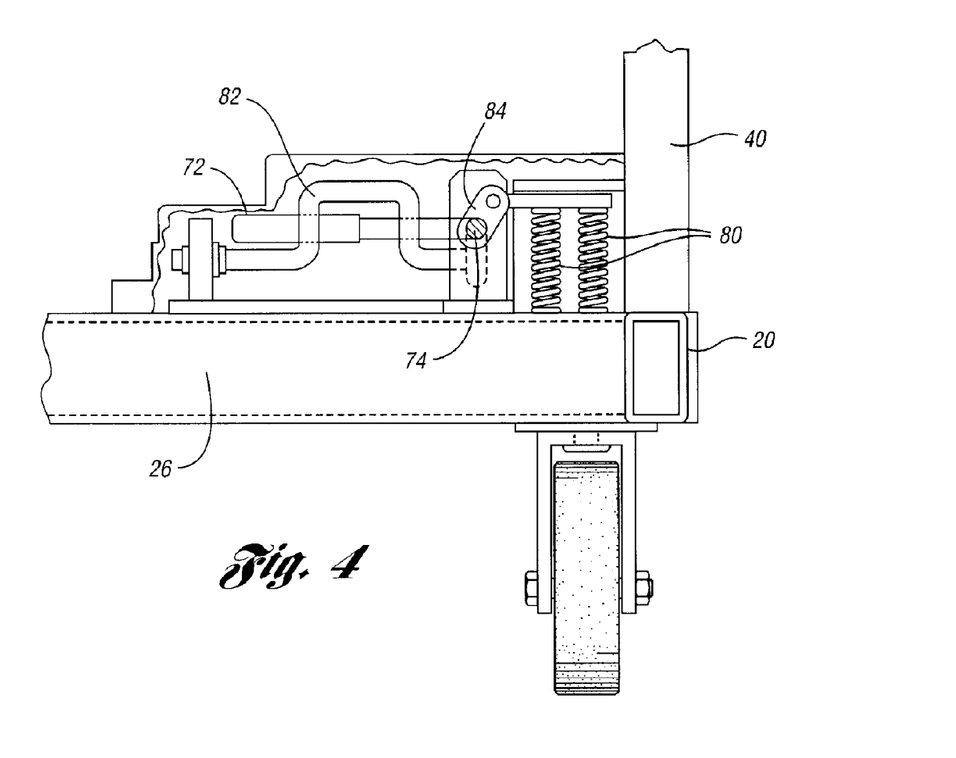
FIG. 4 is a side elevation view of part of the locking mechanism along line 4-4 in FIG. 2.

One or more springs 80 may be employed to bias the pedal 78, 78' upwardly and hold the pivot lever 72 in the locked position.

An automatic actuator bar 82 may be disposed on the frame 12. The automatic actuator bar 82 is adapted to actuate the pivot lever 72 in response to force exerted by a dolly 34 when it is inserted into a compartment 30. In one embodiment, the automatic actuator bar 82 is generally U-shaped and is connected to the elongate bar 74 by a link 84. The automatic actuator bar 82 extends into the compartment 30 when the pivot lever 72 is in the open position. Upon insertion of a dolly 34 into the compartment 30, the dolly 34 pushes against the automatic actuator bar 82, overcomes the biasing force of the spring 80, and the pivot lever 72 rotates toward the locked position.

Referring to FIGS. 5 and 6, an exemplary embodiment of a dolly 34 is shown. A more detailed description of such a dolly is found in U.S. application Ser. No. 10/065,224, which is incorporated by reference in its entirety. The dolly 34 may include a platform 90 having a honeycomb support structure 92, one or more inserts 94 configured to engage the roller guides 60, 60', one or more holes 96 that facilitate water drainage or positioning of a load on the platform 90, and one or more pockets 98 for receiving wheels of another dolly when one dolly is stacked upon another.

While the best mode for carrying out the invention has been described in detail, those familiar with the art to which this invention relates will recognize various alternative designs and embodiments for practicing the invention as defined by the following claims.

What is claimed is:

1. A delivery rack system comprising:
a frame including:
a side rail offset from a center axis, the side rail having a top surface,
a first transverse rail disposed coplanar with the side rail and having a first top surface disposed coplanar with the top surface, the first transverse rail having first and second beams that are spaced apart and disposed substantially parallel to each other, and
a second transverse rail having a second top surface disposed coplanar with the top surface and first top surface and spaced apart from the first transverse rail;
first and second sets of rollers disposed on the first and second transverse rails, respectively; and
a plurality of wheels supporting the frame;
a locking mechanism having a spring assisted reset pedal disposed on the first transverse rail that is coupled to an elongate bar having a pivot lever that moves between a first position and a second position, and an actuator bar having a U-shaped portion that does not extend into the compartment when the pivot lever is in the first position and that extends into the compartment when the pivot lever is in the second position;
wherein the side rail, first transverse rail, and second transverse rail cooperate to define a compartment; and
wherein the center axis is disposed in a vertical plane that perpendicularly bisects the first and second transverse rails.

2. The delivery rack system of claim 1 further comprising first and second upright rails disposed proximate the first and second transverse rails, respectively, and a top rail extending between the first and second upright rails.

3. The delivery rack system of claim 2 further comprising a support rail having a first end disposed proximate the side rail and a second end disposed proximate the top rail.

4. The delivery rack system of claim 2 further comprising a support rail having a first end disposed proximate the first transverse rail and a second end disposed proximate the top rail.

5. The delivery rack system of claim 2 further comprising a support rail having a first end disposed proximate the side rail and a second end disposed proximate the first upright rail.

6. The delivery rack system of claim 2 further comprising a support rail having a first end disposed proximate the first transverse rail and a second end disposed proximate the first upright rail.

7. The delivery rack system of claim 1 further comprising a hook and a hook receptacle disposed outside the compartment along the center axis and proximate opposite ends of the frame.

8. The delivery rack system of claim 1 wherein at least one roller is downwardly offset relative to another roller.

9. A delivery rack system comprising:
a frame including:
a base having a side rail defining a first side of the frame, and first, second, and third transverse rails spaced apart from each other and extending from the side rail, first and second pivot levers having a spring assisted reset pedal, the first and second pivot levers being rotatably disposed on the first and third transverse rails, wherein the first and second pivot levers extend toward the second transverse rail when in a first position and do not extend toward the second transverse rail when disposed in a second position;

first, second, and third upright rails extending from the first, second, and third transverse rails, respectively, the first, second and third upright rails at least partially defining a second side of the frame disposed opposite the first side, a top rail extending from the first, second, and third upright rails, and at least one support rail extending from the base at a first end and extending from the top rail at a second end;

a plurality of wheels supporting the frame; and a plurality of rollers disposed on the first, second, and third transverse rails;

wherein the side rail, first transverse rail, and second transverse rail cooperate to at least partially define a first compartment and the side rail, second transverse rail, and third transverse rail cooperate to at least partially define a second compartment; and wherein the side rail is generally coplanar with the first and second transverse rails and spaced apart from a center axis that substantially bisects the first transverse rail and the first compartment.

10. The delivery rack system of claim 9 wherein the at least one support rail further comprises first, second, and third support rails extending between the side rail and the top rail, the first support rail disposed adjacent to the first compartment, the second support rail disposed between the first and second compartments, and the third rail disposed adjacent to the second compartment.

11. The delivery rack system of claim 10 wherein the second support rail, second upright rail, and second transverse rail are disposed in a plane.

12. The delivery rack system of claim 9 wherein the side rail and the first, second, and third transverse rails are coplanar.

13. The delivery rack system of claim 9 wherein the first, second, and third upright rails extend away from the plurality of wheels.

14. The delivery rack system of claim 9 wherein the first compartment further comprises a first opening defined by the first upright rail, second upright rail, and top rail and the second compartment further comprises a second opening defined by the second upright rail, third upright rail, and top rail.

15. The delivery rack system of claim 9 wherein all compartment openings are disposed on a common side of the frame.

16. A delivery rack system comprising:
a frame including:
a side rail offset from a center axis and defining a first side of the frame, first, second, and third transverse rails spaced apart from each other and extending from the side rail, first, second, and third upright rails extending from the first, second, and third transverse rails, respectively, a top rail extending from the first, second, and third upright rails, and first, second, and third support rails extending between the side rail and the top rail;

a plurality of wheels supporting the frame; and first and second L-shaped pivot levers having a spring assisted reset pedal, the first and second L-shaped pivot levers being rotatably disposed on the first and third transverse rails, wherein the first and second L-shaped pivot levers extend toward each other when in a first position and do not extend toward each other when disposed in a second position;

wherein the side rail, first transverse rail, and second transverse rail cooperate to at least partially define a first compartment and the side rail, second transverse rail, and third transverse rail cooperate to at least partially define a second compartment; and wherein the center axis is disposed in a plane disposed parallel to the first and second upright rails that bisects the first and second compartments and the first and second transverse rails.

17. The delivery rack system of claim 16 further comprising a first set of rollers disposed on the first transverse rail and extending toward the first compartment, a second set of rollers disposed on the second transverse rail and extending toward the first compartment, a third set of rollers disposed on the second transverse rail and extending toward the second compartment, and a fourth set of rollers disposed on the third transverse rail and extending toward the second compartment.

18. The delivery rack system of claim 16 further comprising a locking mechanism including a lever that moves between a first position in which it is disposed above at least one of the first and second transverse rails and a second position in which the pivot lever extends toward the first compartment.

* * * * *